(12) United States Patent
Tanaka

(10) Patent No.: US 7,890,764 B2
(45) Date of Patent: Feb. 15, 2011

(54) SYSTEM, APPARATUS, PROGRAM AND METHOD FOR OBTAINING TIME STAMP

(75) Inventor: Tomonari Tanaka, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1181 days.

(21) Appl. No.: 11/525,035

(22) Filed: Sep. 22, 2006

(65) Prior Publication Data

US 2007/0079132 A1     Apr. 5, 2007

(30) Foreign Application Priority Data

Sep. 30, 2005  (JP)  ............................ P2005-287736

(51) Int. Cl.
*H04L 9/32*     (2006.01)
(52) U.S. Cl. ...................................... 713/178
(58) Field of Classification Search ................. None
See application file for complete search history.

(56) References Cited

U.S. PATENT DOCUMENTS

| 6,587,945 B1* | 7/2003 | Pasieka ...................... 713/176 |
| 2003/0115451 A1* | 6/2003 | Walker et al. ................ 713/153 |
| 2005/0004899 A1* | 1/2005 | Baldwin et al. ................ 707/3 |
| 2005/0235140 A1* | 10/2005 | Hui et al. ..................... 713/156 |
| 2006/0095795 A1* | 5/2006 | Nakamura et al. .......... 713/193 |

FOREIGN PATENT DOCUMENTS

| JP | 2000-235340 | 8/2000 |
| JP | 2001-517818 | 10/2001 |
| JP | 2001-350405 | 12/2001 |
| JP | 2002-006739 | 1/2002 |
| JP | 2005-204126 | 7/2005 |
| WO | WO 99/16209 | 4/1999 |

OTHER PUBLICATIONS

"Guideline of Time Stamp for Long-Run Guarantee", Time Business Forum (TBF), (2005).

* cited by examiner

*Primary Examiner*—David J Pearson
(74) *Attorney, Agent, or Firm*—Finnegan, Henderson, Farabow, Garrett & Dunner, L.L.P.

(57) ABSTRACT

A time stamp obtaining apparatus for maintaining the certificate of the existence of electronic filing document including: a receiving unit 12 receiving hash value of the document data; a transmitting section 15c transmitting the hash value to time stamp providing apparatus 30a; a storing processing section 15d inserting the time stamp encoded with private key in unupdated data 16b concerning time stamp received since point to which private key is updated and storing; an update detecting section 11 detecting the update of private key; a calculation section 13b calculating hash value for all time stamps included in the unupdated data 16b; a transmitting section 13c transmitting the hash value; a storing processing section 13d moving the unupdated data 16b to past data 16c concerning time stamp received before point to which private key is updated last time when time stamp is received, storing it, and storing the time stamp newly received as new unupdated data 16b; is provided.

16 Claims, 12 Drawing Sheets

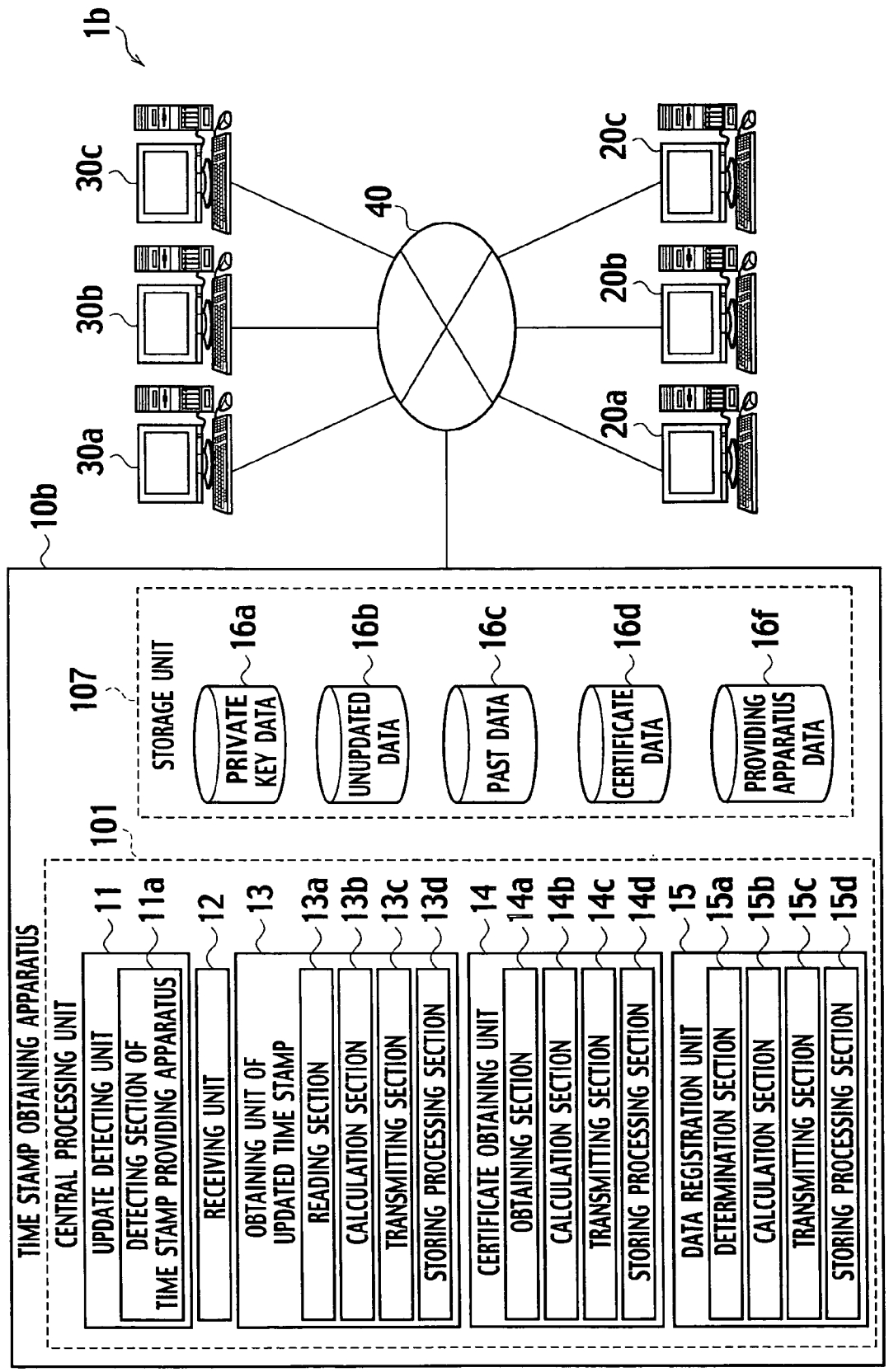

SYSTEM, APPARATUS, PROGRAM AND METHOD FOR OBTAINING TIME STAMP

CROSS REFERENCE TO RELATED APPLICATIONS

This application claims benefit of priority under 35 USC §119 to Japanese Patent Application No. 2005-287736 filed on Sep. 30, 2005, the entire contents of which are incorporated by reference herein.

BACKGROUND OF THE INVENTION

1. Field of the Invention

The present invention pertains to a system, an apparatus, a program and a method for obtaining a time stamp, in order to update the time stamp.

2. Description of the Related Art

The time stamp is widespread to certify the existence of documents at each time. A time stamp providing apparatus that a so-called Time stamp Authority owns generates the time stamp. The time stamp providing apparatus generates the time stamp signing with a unique private key, to data that sets "Time" and "Hash value" of electronic data of the documents, etc. by using a technology of a digital signature. The time stamp certifies the existence of the electronic data corresponding to "Hash value" at the time by "Time" included in the time stamp.

Conventionally, in the case where it seemed the time stamp compromise by some reasons, a technology of extending validity term by newly generating a time stamp to the time stamp that already existed by other private keys is disclosed. (Refer to, for example, "GUIDELINE OF TIME STAMP FOR LONG-RUN GUARANTEE", February, 2005, Time Business Forum (TBF), "URL:http://www.scat.or.jp/time/PDF/choukihosyouguidelin eVer1.1.pdf" searched on Jul. 15, 2005). Moreover, a technology that signed repeatedly according to the timing of the update of the private key is disclosed in Japanese patent Laid Open Publication (Kokai) No. 2002-6739.

However, according to the above technique disclosed in "GUIDELINE OF TIME STAMP FOR LONG-RUN GUARANTEE", when it turned out back to have made the time stamp to compromise by point (time) at the past, the time stamp becomes invalid without giving the occasion for updating the time stamp. Therefore, there is a problem that the existence of the documents is not able to be certified.

Moreover, according to the above technique disclosed in Japanese patent Laid Open Publication (Kokai) No. 2002-6739, although there is a resistance to the falsification by making of the private key to compromise, it is not the time stamp. Therefore, there is a problem that the existence of the document at the time of the first signature is not able to be certified over a long period of time.

BRIEF SUMMARY OF THE INVENTION

Therefore, the present invention is performed to solve the above-mentioned problem. The embodiments of the present invention provide a system, an apparatus, a program and a method for obtaining a time stamp in order to maintain the certification of the existence of the documents.

In order to solve the above-mentioned problem, a time stamp providing system according to an embodiment of the present invention includes a time stamp providing apparatus and a time stamp obtaining apparatus, the time stamp providing apparatus connected with the time stamp obtaining apparatus. The time stamp providing apparatus includes: a time stamp generate section configured to generate a time stamp by using an updated private key for data including time and a hash value received from the time stamp obtaining apparatus; and a time stamp transmission section configured to transmit the time stamp generated by the time stamp generate section to the time stamp obtaining apparatus. The time stamp obtaining apparatus comprising: a receiving unit configured to receive the hash value calculated from one of document data transmitted from a terminal and the document data; a first calculation section configured to calculate the received hash value of the document data; a first transmitting section configured to transmit one of the hash value received from the terminal and the hash value calculated from the document data by the first calculation section to the time stamp providing apparatus; a first storing processing section configured to add the time stamp to unupdated data and stores the time stamp in a storage unit when the time stamp generated for the hash value transmitted by the first transmitting section is received from the time stamp providing apparatus, the unupdated data being data concerning the time stamp received from the time stamp providing apparatus since a point to which a private key used by the time stamp providing apparatus is updated last time; an update detecting section configured to detect update of the private key of the time stamp used by the time stamp providing apparatus; a second calculation section configured to calculate one hash value for all time stamps included in the unupdated data when the update detecting section detects the update of the private key; a second transmitting section configured to transmit the calculated hash value to the time stamp providing apparatus; and a Second storing processing section configured to move the unupdated data to past data and store the unupdated data in the storage unit when the time stamp generated for the hash value transmitted by the second transmitting section is received from the time stamp providing apparatus, and to store the newly received time stamp in the storage unit as new unupdated data, the past data being data concerning the time stamp received from the time stamp providing apparatus before point to which private key is updated by the time stamp providing apparatus last time.

A time stamp obtaining apparatus connected with the time stamp providing apparatus according to another embodiment of the present invention, the time stamp providing apparatus transmitting a time stamp generated by updated private key for data, the data including time and received hash value, the time stamp obtaining apparatus includes: a receiving unit configured to receive the hash value calculated from one of document data transmitted from a terminal and the document data; a first calculation section configured to calculate the received hash value of the document data; a first transmitting section configured to transmit one of the hash value received from the terminal and the hash value calculated from the document data by the first calculation section to the time stamp providing apparatus; a first storing processing section configured to add the time stamp to unupdated data and stores the time stamp in a storage unit when the time stamp generated for the hash value transmitted by the first transmitting section is received from the time stamp providing apparatus, the unupdated data being data concerning the time stamp received from the time stamp providing apparatus since point to which a private key used by the time stamp providing apparatus is updated last time; an update detecting section configured to detect update of the private key of the time stamp used by the time stamp providing apparatus; a second calculation section configured to calculate one hash value for all time stamps included in the unupdated data when the update detecting section detects the update of the private key; a second transmitting section configured to transmit the calculated hash value to the time stamp providing apparatus; and a Second storing processing section configured to move the unupdated data to past data and store the unupdated data in the storage unit when the time stamp generated for the hash value transmitted by the second transmitting section is received from the time stamp providing apparatus, and to store the newly received time stamp in the storage unit as new unupdated data, the past data being data concerning the time stamp received from the time stamp providing apparatus before point to which private key is updated by the time stamp providing apparatus last time.

A computer-executable program product for obtaining a time stamp according to another embodiment of the present invention, the computer-executable program product includes: receiving the hash value calculated from one of document data transmitted from a terminal and the document data; calculating the received hash value of the document data; transmitting one of the hash value received from the terminal and the hash value calculated from the document data to a time stamp providing apparatus; adding the time stamp to the unupdated data which is data concerning the time stamp received from the time stamp providing apparatus since point to which the private key used by the time stamp providing apparatus is updated last time when the time stamp generated with the updated private key is received from the time stamp providing apparatus for data to which time and the transmitted the hash value are included, and storing the time stamp in a storage unit; detecting update of the private key of the time stamp used by the time stamp providing apparatus; calculating one hash value for all time stamps included in the unupdated data when the update detecting section detects the update of the private key; transmitting the calculated hash value to the time stamp providing apparatus; and moving the unupdated data to past data and storing the unupdated data in the storage unit when the time stamp generated with the updated private key is received from the time stamp providing apparatus for data to which time and the transmitted the hash value are included, and storing the newly received time stamp in the storage unit as new unupdated data, the past data being data concerning the time stamp received from the time stamp providing apparatus before point to which private key is updated by the time stamp providing apparatus last time.

BRIEF DESCRIPTION OF THE DRAWINGS

FIG. 12 is an illustration for explaining a time stamp obtaining system having a time stamp obtaining apparatus according to a second modified embodiment of the present invention.

DETAILED DESCRIPTION

Figure 1:
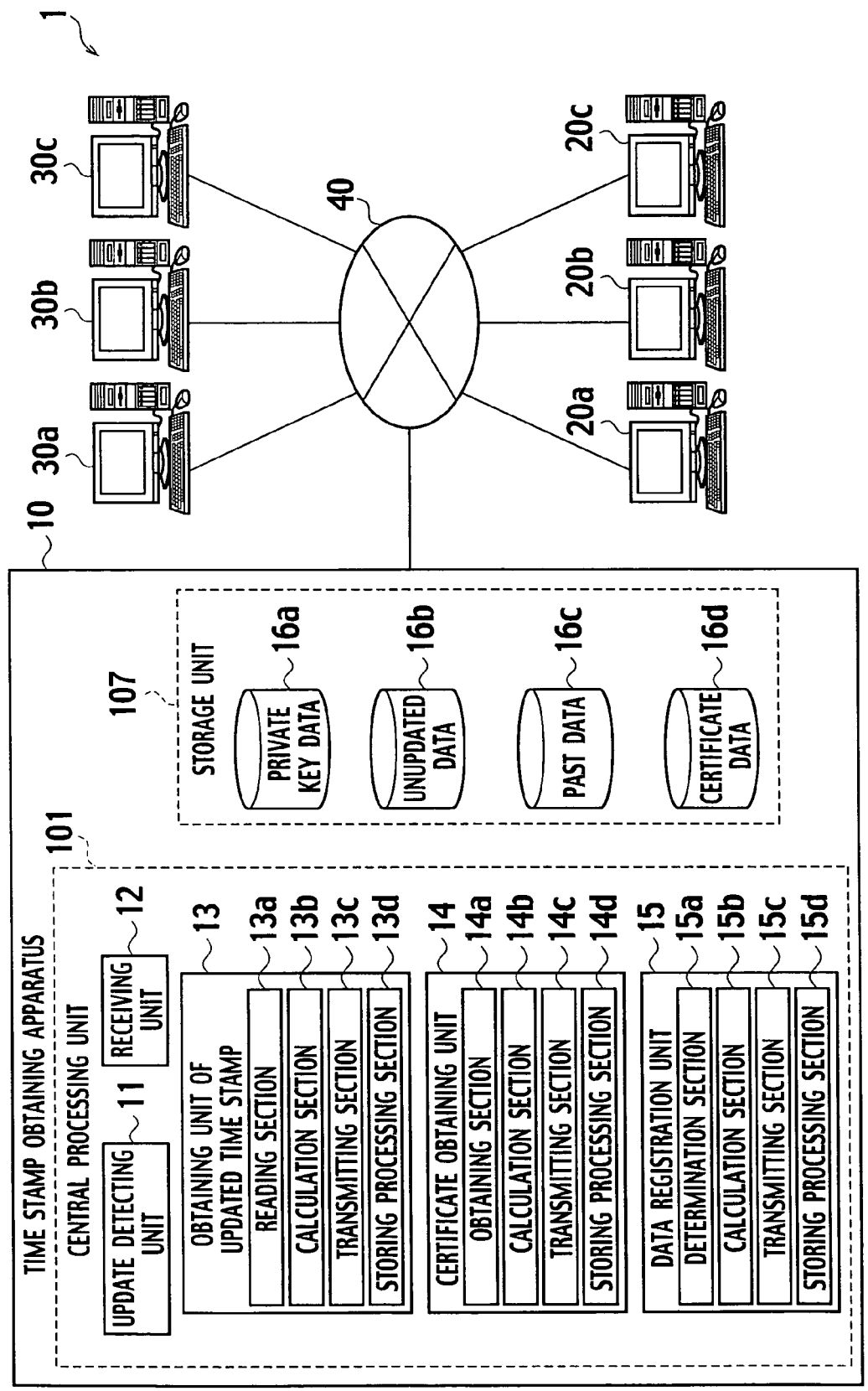
FIG. 1 is an illustration for explaining a time stamp obtaining system having a time stamp obtaining apparatus according to an embodiment of the present invention.

Various embodiments of the present invention will be described herein below with reference to the accompanying drawings. It is to be noted that the same or similar reference numerals are applied to the same or similar parts and elements throughout the drawings, and the description of the same or similar parts and elements will be omitted or simplified. However, it is to be noted that the accompanying drawings are anything more than the schematic diagrams.

Time Stamp Obtaining System

FIG. 1 is an illustration for explaining a time stamp obtaining system according to an embodiment of the present invention.

Time stamp obtaining system 1 includes a time stamp obtaining apparatus 10, terminals 20a to 20c, and time stamp providing apparatuses 30a to 30c, and they are connected mutually through network 40.

The time stamp obtaining apparatus 10 according to the embodiment of the present invention receives hash value H of document data in order to obtain the certification of existence from the terminal 20a, 20b or 20c. Then, The time stamp obtaining apparatus 10 obtains a time stamp S generated by signing (encoding) time and the hash value H with the private key from the time stamp providing apparatus 30a, 30b or 30c.

The time stamp providing apparatus 30a updates regularly the private key stored in the time stamp providing apparatus 30. When the used private key is updated by either of connected time stamp providing apparatus 30a to 30c, the time stamp obtaining apparatus 10 obtains the time stamp of public key certificate D of the updated private key from other connected time stamp providing apparatus. The public key certificate D certifies that the private key corresponding to a public key is the private key used by the time stamp providing apparatus 30a to 30c.

Detailed of the composition of the time stamp obtaining apparatus 10 will be described later based on FIG. 1 and FIG. 2.

Each of the terminals 20a to 20c is a general information process terminal (for example, Personal Computer (PC) etc.) included a storage unit, and the storage unit stores the document data in order to request the certification of existence. Moreover, each of the terminals 20a to 20c transmits the document data stored in the storage unit or the hash value H calculated from the document data to the time stamp obtaining apparatus 10. Since each terminal 20a to 20c is the same composition, it will describe in the following descriptions with the terminal 20a. Even if the terminal 20a is replaced with suitable terminal 20b or 20c, it is however similar. In addition, the terminals included in the time stamp obtaining system 1 are not limited to three pieces.

Each time stamp providing apparatus 30a to 30c includes a time stamp generate section and a time stamp transmission section (not shown in the figure). The time stamp generate section receives the "Hash value H" from the time stamp obtaining apparatus 10. Thereafter, the time stamp generate section generates "Time stamp S" by signing data included "Time" and the received "Hash value H" with the private key stored in the time stamp providing apparatus. The time stamp transmission section transmits the time stamp S generated by the time stamp generate section to the time stamp obtaining apparatus 10.

The "Time" included in the "Time stamp S" is, for example, time when the time stamp including the hash value is generated, or time when the hash value is received. Each time stamp providing apparatus 30a to 30c updates the private key used for encoding regularly or irregularly. Each time stamp providing apparatus 30a to 30c is, for example, an apparatus being had by so-called the time stamp bureau. Since each time stamp providing apparatus 30a to 30c is the same composition, it will describe in the following descriptions with the time stamp providing apparatus 30a. Even if the time stamp providing apparatus 30a is replaced with suitable time stamp providing apparatus 30b or 30c, it is however similar. In addition, the terminals (time stamp providing apparatuses) included in the time stamp obtaining system 1 are not limited to three pieces.

Time Stamp Obtaining Apparatus

As shown in FIG. 1, the time stamp obtaining apparatus 10 includes an update detecting unit 11, a receiving unit 12, an obtaining unit of updated time stamp 13, a certificate obtaining section 14, a data registration section 15, a private key data 16a, unupdated data 16b, past data 16c, and certificate data 16d.

Figure 2:
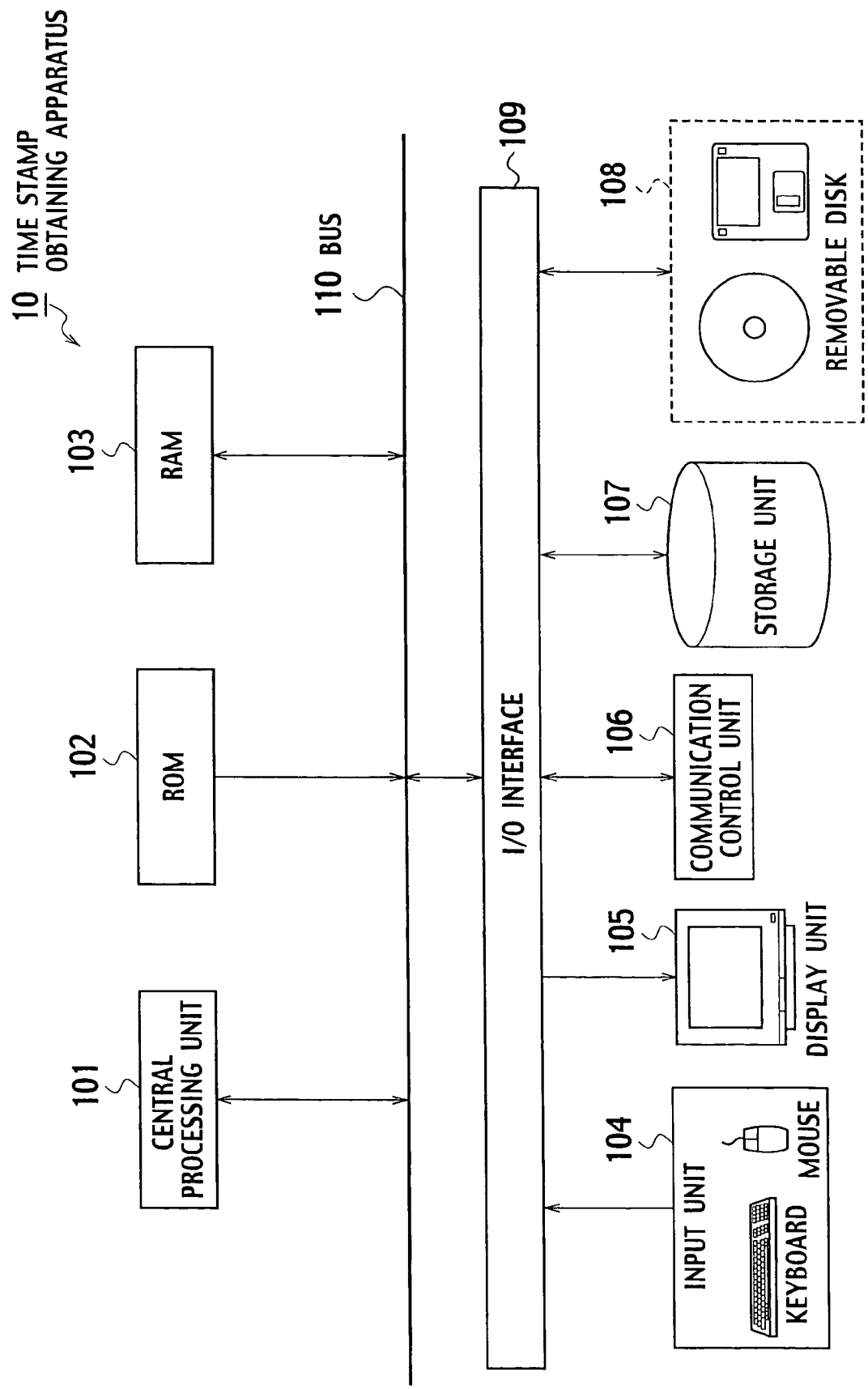
FIG. 2 is an illustration showing an example of a hardware structure chart of the time stamp obtaining apparatus according to the embodiment of the present invention.

As shown in FIG. 2, the time stamp obtaining apparatus 10 according to the embodiment of the present invention includes a central processing unit 101, a read only memory (ROM) 102, a random access memory (RAM) 103, and an input and output interface 109, all of which are connected to one another through a bus 110. Meanwhile, an input unit 104, a display unit 105, a communication control unit 106, a storage unit 107, and a removable disk 108 are connected to the input and output interface 109.

The central processing unit 101 reads and executes a boot program for starting the time stamp obtaining apparatus 10 out of the ROM 102 based on an input signal from the input unit 104, and then reads an operating system stored in the storage unit 107. Further, the central processing unit 101 is the processing device which is configured to control the respective devices based on input signals from the input unit 104, the communication control unit 106, and the like, to read programs and data stored in the storage unit 107, and the like and to load the programs and the data into the RAM 103, and to realize a series of processing to be described later, including data calculation and data processing, based on commands of the program read out of the RAM 103.

The input unit 104 includes an input unit such as a keyboard or a mouse for allowing the operator to input various operations such as inputting characters. The input unit 104 generates input signals based on the operations by the operator, and transmits the input signals to the central processing unit 101 through the input and output interface 109 and the bus 110. The display unit 105 is a cathode ray tube (CRT) display, a liquid crystal display or the like, which is the device configured to receive an output signal to be displayed on the display unit 105 from the central processing control device 101 through the bus 110 and the input and output interface 109, and to display a processing result of the central processing unit 101, for example.

The communication control unit 106 is a device such as a local area network (LAN) card or a modem, which is the device configured to connect the time stamp obtaining apparatus 10 to a communication network such as the Internet or a LAN. Data transmitted to or received from the communication network through the communication control unit 106 are transmitted to or received by the central processing control device 101 through the input and output interface 109 and the bus 110 as input signals or as output signals.

The storage unit 107 is a semiconductor storage device, a magnetic disk device or the like, which is configured to store the program and the data to be executed by the central processing unit 101. The removable disk 108 represents an optical disk or a flexible disk. Signals written in or read out by a disk drive are transmitted to or received from the central processing unit 101 through the input and output interface 109 and the bus 110. The storage unit 107 stores the private key data 16a, the unupdate data 16b, the past data 16c and the certificate data 16d.

Note that the time stamp obtaining apparatus 10 according to the embodiment of the present invention may be realized either by a single computer or by a plurality of computers capable of communicating with one another.

The update detecting unit 11, the receiving unit 12, the obtaining unit of updated time stamp 13, the certificate obtaining section 14 and the data registration section 15 are implemented as a result of reading and execution of the time stamp obtaining program by the central processing unit 101 of the time stamp obtaining apparatus 10.

The time stamp obtaining apparatus 10 according to the embodiment of the present invention may be executed in single computer as shown in FIG. 1, and also may be executed in plural computers that can communicate mutually. In addition, for example, the time stamp obtaining apparatus 10 may be compositions in which a storage unit 107 is provided outside, and also may be compositions in which only a part of data of the storage unit 107 is provided outside.

Figure 3:
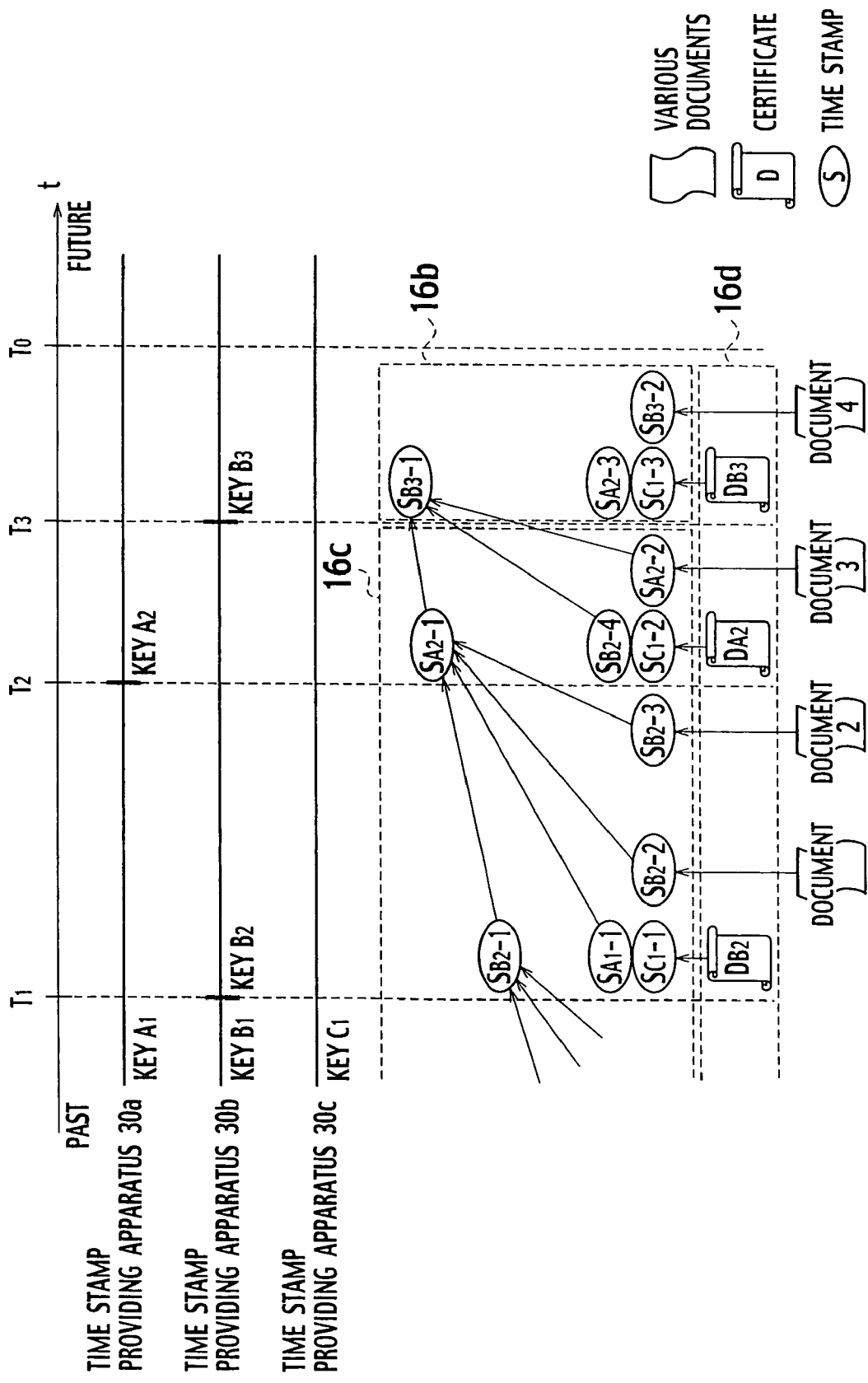
FIG. 3 is an illustration for explaining a private key used by each time stamp providing apparatus for encoding, unupdated data and past data.

Next, the private key that each time stamp providing apparatus 30a to 30c uses for encoding, the private key data 16a, the unupdated data 16b, the past data 16c, and the certificate data 16d will be described based on FIG. 3. In FIG. 3, a transverse axis is a time base that shows the past is to the left, and shows the future is to the right.

Although the time stamp providing apparatus 30a had used "Private key $A_1$" in the past, "Private key $A_2$ (herein below, abbreviated as "Key $A_2$")" has been used since "Time T2". Furthermore, although the time stamp providing apparatus 30b had used "Private key $B_1$" in the past, "Private key $B_2$" had been used from "Time $T_1$" to "Time $T_3$", and then "Private key $B_3$ (herein below, abbreviated as "Key $B_3$")" has been used since "Time $T_3$". The time stamp providing apparatus 30c has used "Private key $C_1$(herein below, abbreviated as "Key $C_1$")".

The private key data 16a relates an identifier of the time stamp providing apparatus 30a connected with the time stamp obtaining apparatus 10 to an identifier of the private key used in order that the time stamp providing apparatus 30a generates the time stamp S at the moment (time $T_0$). In an example of showing in FIG. 3, the private key data 16a relates the time stamp providing apparatus 30a to key $A_2$, the time stamp providing apparatus 30b to key $B_3$, and the time stamp providing apparatus 30c to key $C_1$ respectively.

The unupdated data 16b is data concerning time stamps S received by the time stamp obtaining apparatus 10 after the time when the private key was updated by either of the time stamp providing apparatus 30a last time. The unupdated data 16b shown in FIG. 3 is an example of data concerning the time stamps received between time $T_3$ and current (time $T_0$).

The past data 16c is data concerning time stamps S received by the time stamp obtaining apparatus 10 before the time when the private key was updated by either of the time stamp providing apparatus 30a last time. The past data 16c shown in FIG. 3 is an example of data concerning the time stamp received before time $T_3$.

The certificate data 16d is data to accumulate the public key certificate obtained by the time stamp obtaining apparatus 10 from the time stamp providing apparatus 30a, 30b or 30c. The certificate data 16d shown in FIG. 3 is an example of data to accumulate public key certificate $DB_2$ of key $B_2$, public key certificate $DA_2$ of key $A_2$, and public key certificate $DB_3$ of key $B_3$. However, the certificate data 16d also accumulates the past public key certificate obtained before time $T_1$ not shown in FIG. 3.

The update detecting unit 11 reads the private key data 16a from the storage unit 107. Therewith the update detecting unit 11 compares the private keys accessed to and obtained from the connected time stamp providing apparatus 30a, and then detects the update of the private key. Although the time stamp providing apparatus 30a might change a signature scheme, the time stamp providing apparatus 30a updates the private key according to a new signature scheme. Therefore, when the time stamp providing apparatus 30a updates the signature scheme, the update detecting unit 11 also detects the update of the private key.

More specifically, the update detecting unit 11 compares the private key of the time stamp provided by the time stamp providing apparatus 30a and the private key included in the read private key data 16a. Then, when two compared private keys are different, the update detecting unit 11 determines that the time stamp providing apparatus 30a updates the private key. This execution by the update detecting unit 11 is executed by comparing the public key certificates of the private key.

The receiving unit 12 receives the document data transmitted to the connected terminal 20a or the hash value calculated from the document data through the communication control unit 106. The document data is document data by the electronic data.

As shown in FIG. 1, the obtaining unit of updated time stamp 13 includes a reading section 13a, a calculation section 13b, a transmitting section 13c, and a storing processing section 13d.

When the update of the private key is detected by the update detecting unit 11, the reading section 13a reads the unupdated data 16b from the storage unit 107.

The calculation section 13b calculates hash value H for all time stamps S included in the unupdated data 16b read by the reading section 13a. Here, the calculation section 13b considers all time stamps S included in the unupdated data 16b as one data, and then calculates one hash value H for this one data.

The transmitting section 13c transmits the hash value H calculated by the calculation section 13b to the time stamp providing apparatus 30a that updated the private key.

The storing processing section 13d receives the time stamp S generated for the hash value H transmitted by the transmitting section 13c from the time stamp providing apparatus 30a.

Then, storing processing section 13d moves the unupdated data 16b to the past data 16c and stores it in the storage unit 107. Thereafter, the storing processing section 13d stores the newly received time stamp S in the storage unit 107 as new unupdated data 16b.

The certificate obtaining section 14 includes an obtaining section 14a, a calculation section 14b, a transmitting section 14c, and a storing processing section 14d. When the update of the private key is detected by the update detecting unit 11, the obtaining section 14a obtains the public key certificate D of the updated private key from the time stamp providing apparatus 30a.

The calculation section 14b calculates hash value H of the public key certificate D obtained by the obtaining section 14a.

The transmitting section 14c transmits the hash value H calculated by the calculation section 14b to the time stamp providing apparatuses 30b and 30c.

The storing processing section 14d receives the time stamp S generated for the hash value H transmitted by the transmitting section 14c from the time stamp providing apparatuses 30b and 30c. Then, the storing processing section 14d adds the received time stamp S to the unupdated data 16b, and stores it in the storage unit 107.

The data registration section 15 includes a determining section 15a, a calculation section 15b, a transmitting section 15c, and a storing processing section 15d.

When data transmitted from the terminal 20a is received by the receiving unit 12, the determining section 15a determines whether or not the received data is hash value H of the document data. As a result of the determination, if the received data is the hash value H, the determining section 15a determines that this received data is the hash value H calculated on the basis of the electronic data in order to receive the certification of existence. On the other hand, if the received data is not hash value H, the determining section 15a determines that this received data is the document data in order to receive the certification of existence.

If the received data is not the hash value H of the document data, the calculation section 15b calculates hash value H of the received data.

The transmitting section 15c transmits the hash value H received from the terminal 20a or the hash value H calculated by the calculation section 15b to the time stamp providing apparatus 30a to which the private key is newest updated. For the example shown in FIG. 3, the transmitting section 15c transmits the hash value H to the time stamp providing apparatus 30b.

The storing processing section 15d receives the time stamp S generated by the time stamp providing apparatus 30a to the hash value H transmitted by the transmitting section 15c. Then, the storing processing section 15d adds the received time stamp S to the unupdated data 16b and stores it in the storage unit 107.

Updating Processing

A process of time stamp obtaining apparatus 10 when the private key is updated will be described hereafter.

Figure 4:
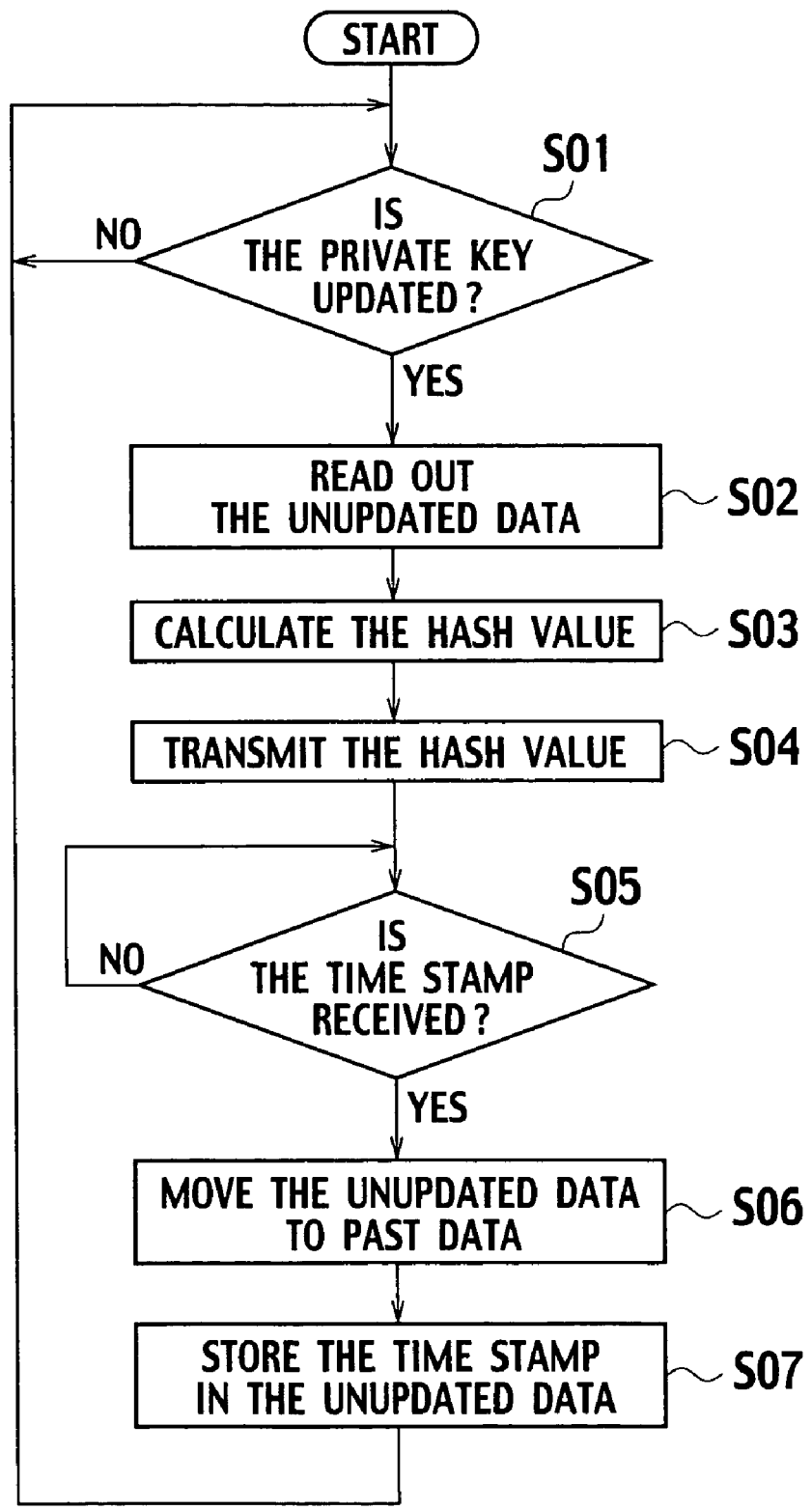
FIG. 4 is a flow chart for explaining process for obtaining the time stamp of an updated private key.

First of all, the process to obtain the time stamp of the updated private key will be described by using the flow chart shown in FIG. 4.

In Step S01, the update detecting unit 11 waiting for detection of the update of the private key in the connected time stamp providing apparatus 30a. When the update of the private key is detected by the update detecting unit 11, the reading section 13a reads the unupdated data 16b from the storage unit 107 in Step S02. Then, in Step S03, the calculation section 13b calculates hash value H considered all time stamps S included in the unupdated data 16b read by the reading section 13a as one data.

In the example of showing in FIG. 3, the calculation section 13b calculates hash value H considered the time stamp $SB_3$-2 of the past data included in the unupdated data 16b (time stamp generated by using key $B_3$), the time stamp $SA_2$-3 and the time stamp $SC_1$-3 of the public key certificate $DB_3$ of key $C_3$ (time stamps generated by using key $C_1$), and the time stamp $SB_3$-1 of the document 4 (time stamp generated by using key B3) as one data.

Thereafter, in Step S04, the transmitting section 13c transmits the hash value H calculated by the calculation section 13b to the time stamp providing apparatus 30a. Then, in Step S05, the storing processing section 13c receives the time stamp S generated for the hash value H transmitted by the transmitting section 13c. Furthermore, in Step S06, the storing processing section 13d moves the unupdated data 16b read by the reading section 13a to the past data 16c, and stores it in the storage unit 107. Moreover, in Step S07, the storing processing section 13d stores the received time stamp S in the storage unit 107 as new unupdated data 16b.

In the case where the private key used by the time stamp providing apparatus 30c is changed to the private key $C_2$ at time $T_4$ shown in FIG. 3, an example of the time stamp obtaining apparatus 10 obtaining the time stamp S of the private key will be described based on FIG. 5. The transmitting section 13c transmits the hash value H calculated by the calculation section 13b in Step S03 to the time stamp providing apparatus 30c. Moreover, the time stamp $SC_2$-1 received by the storing processing section 13d for the hash value H transmitted by the transmitting section 13c is signed with key $C_2$. The storing processing section 13d inserts the received time stamp $SC_2$-1 in the unupdated data 16b, and stores it in the storage unit 107.

Figure 6:
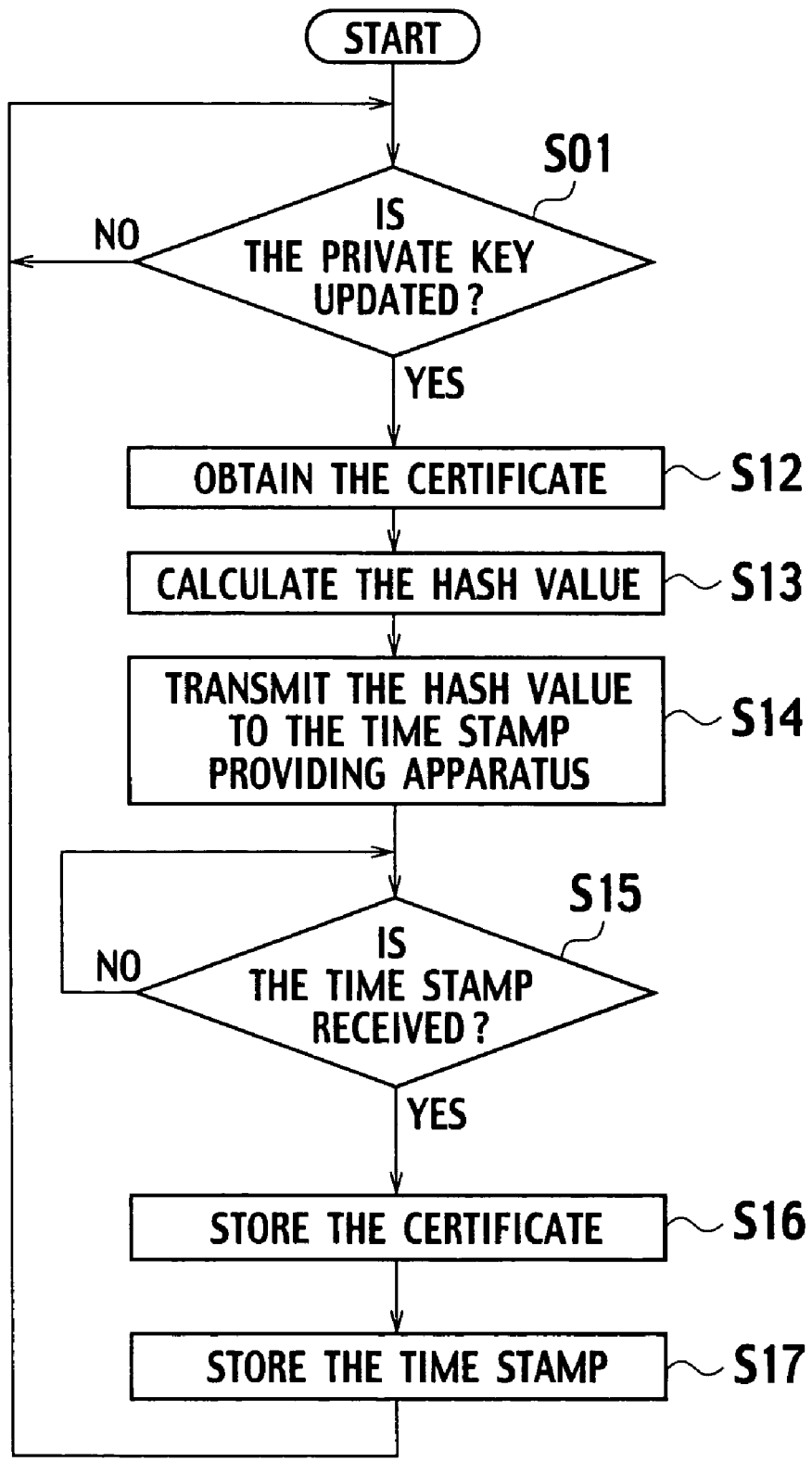
FIG. 6 is a flow chart for explaining process for obtaining a public key certificate of the updated private key.

Next, the process to obtain the public key certificate of the updated private key will be described by using a flow chart shown in FIG. 6.

When the update of the private key is detected by the update detecting unit 11, the obtaining section 14a obtains the public key certificate D of the updated private key from the time stamp providing apparatus 30a in Step S12. Thereafter, in Step S13, the calculation section 14b calculates hash value H of the public key certificate D obtained by the obtaining section 14a. Then, in Step S14, the transmitting section 14c transmits the hash value H calculated by the calculation section 13b to the time stamp providing apparatus 30b and/or 30c other than the time stamp providing apparatus 30a that has updated the private key.

Figure 5:
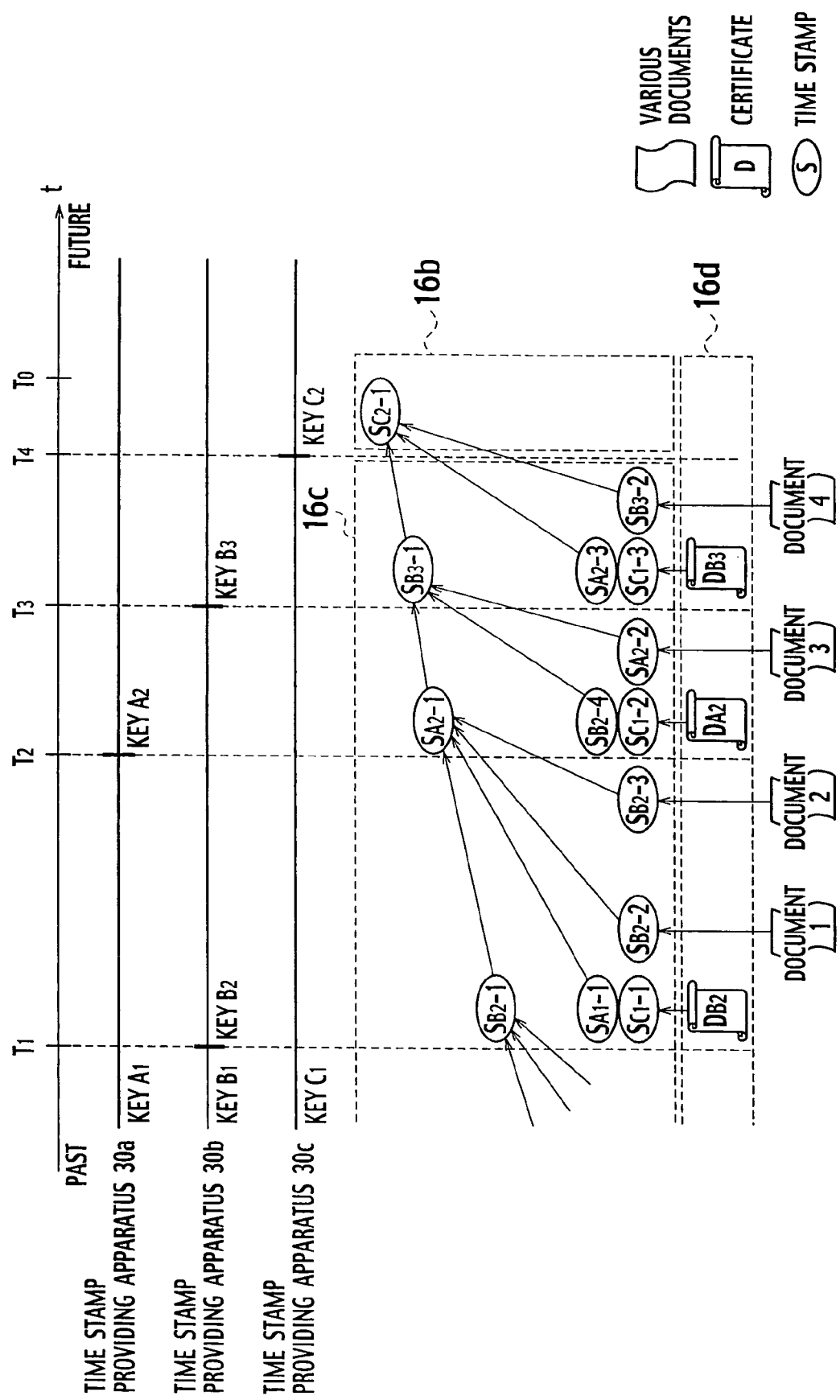
FIG. 5 is an illustration for explaining update of the unupdated data and the past data shown in FIG. 3, when the private key is updated.

For example, as shown in FIG. 5, when the time stamp providing apparatus 30c updates the private key of the time stamp from key $C_1$ to key $C_2$ at time $T_4$, the obtaining section 14a obtains the public key certificate $DC_2$ of key $C_2$ from the time stamp providing apparatus 30c. Then, the calculation section 14b calculates hash value H of the public key certificate $DC_2$ of the obtained key $C_2$. Moreover, the transmitting section 14c transmits the hash value H calculated by the calculation section 14b to the time stamp providing apparatus 30a and/or 30b other than the time stamp providing apparatus 30c.

Thereafter, in Step S15, the storing processing section 14d waits for receiving the time stamp S generated for the hash value H transmitted by the transmitting section 14c. In Step S16, the storing processing section 14d received the time stamp S adds the public key certificate D obtained by the obtaining section 14a to the certificate data 16d, and stores it in the storage unit 107. Moreover, in Step S17, the storing processing section 14d adds the received time stamp S to the unupdated data 16b, and stores it in the storage unit 107.

Figure 7:
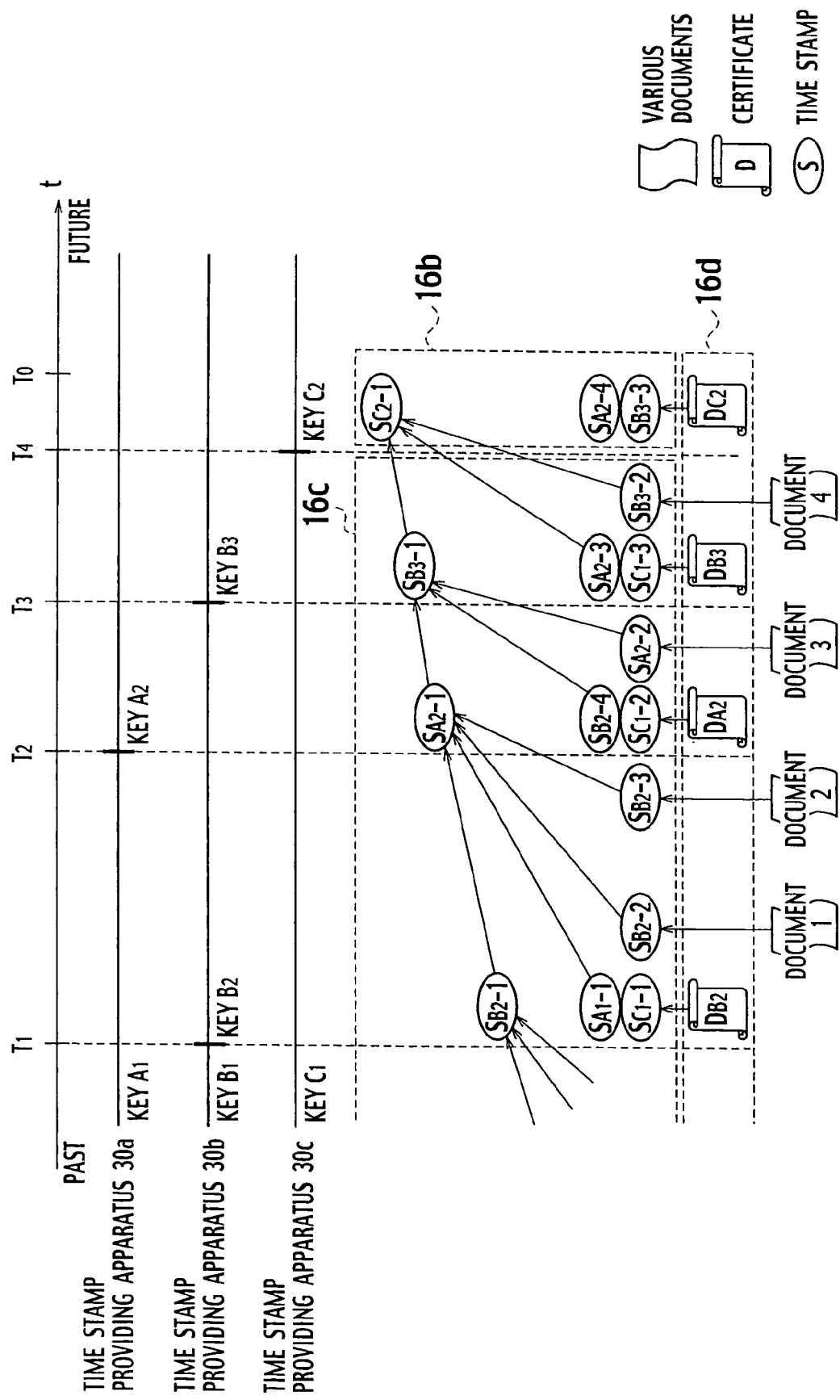
FIG. 7 is an illustration for explaining update of the unupdated data shown in FIG. 5, when the public key certificate is obtained.

In the case of the situation shown in FIG. 5, an example that the time stamp obtaining apparatus 10 obtains the public key certificate will be described based on FIG. 7. The storing processing section 14d receives the time stamp $SA_2$-3 generated for the hash value H of the public key certificate $DC_2$ from the time stamp providing apparatus 30a, and receives the time stamp $SB_2$-3 generated for the hash value H of the public key certificate $DC_2$ from the time stamp providing apparatus 30b. Then, the storing processing section 14d adds the time stamp $SA_2$-3 and $SB_3$-3 to the unupdated data 16b, and stores them in the storage unit 107. Moreover, the storing processing section 14d adds the public key certificate $DC_2$ to the certificate data 16d, and stores it in the storage unit 107.

Registration Processing

Figure 8:
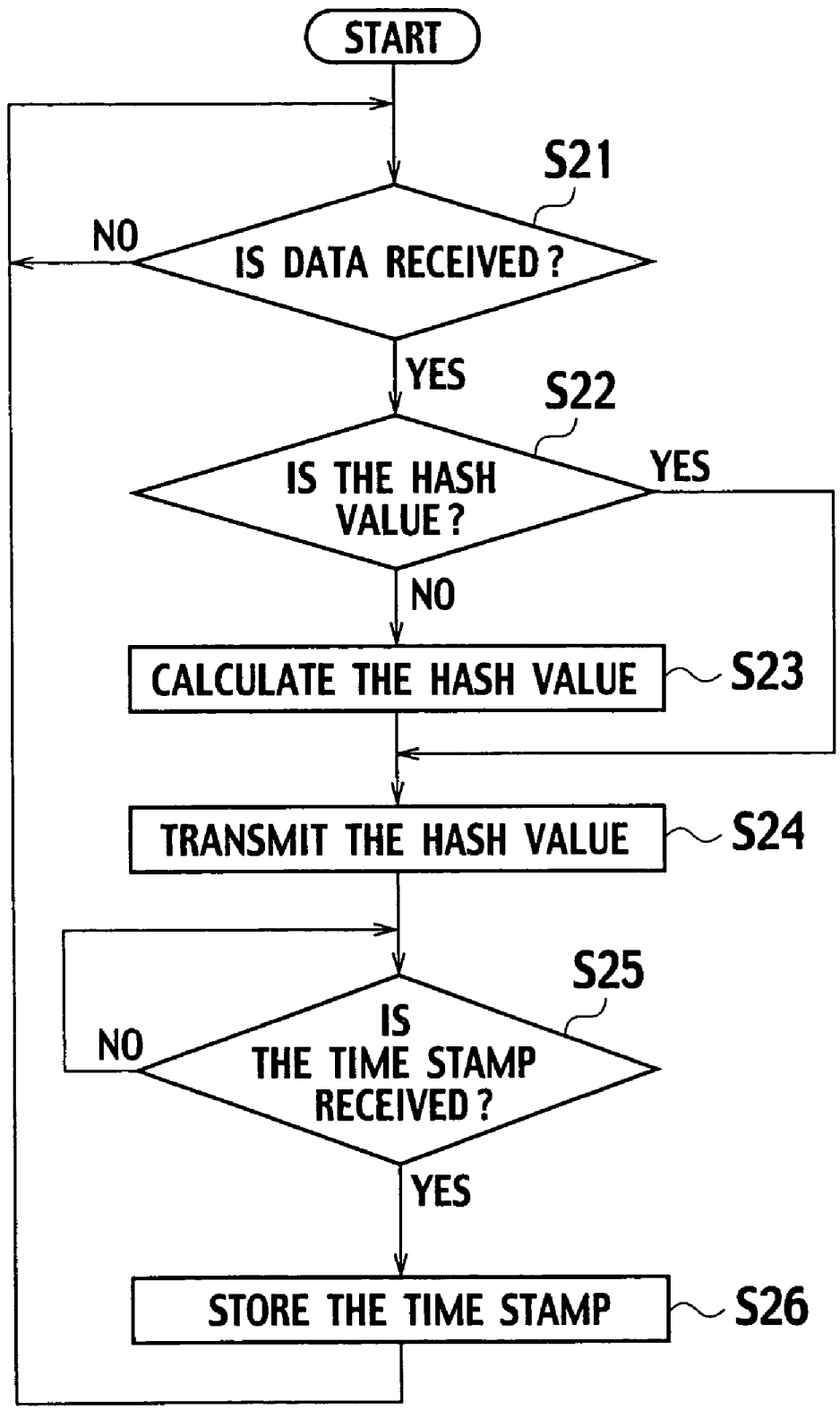
FIG. 8 is a flow chart for explaining process at the time of the registration of new document data.

Next, the process when the time stamp obtaining apparatus 10 registers the document data will be described based on a flow chart shown in FIG. 8.

In Step S21, the receiving unit 12 waits data transmitted by the terminal 20a. When the data is received by the receiving unit 12, the determining section 15a determines whether or not the received data is the hash value H of the document data in Step S22. As a result of the determination, if the data is not hash value H of the document data, the calculation section 15b determines the data as the document data, and calculates hash value H of this document data in Step S23.

Then, in Step S24, the transmitting section 15c transmits the hash value H received by the receiving unit 12 or the hash value H calculated by the calculation section 15b to the time stamp providing apparatus 30a that newest updates the private key.

For example, when document 5 that is the document data is received by the receiving unit 12, the transmitting section 15c transmits hash value H of the document 5 calculated by the calculation section 15b. Moreover, when the hash value H of the document 5 is received by the receiving unit 12, the transmitting section 15c transmits the hash value H received by the receiving unit 12.

Thereafter, in Step S25, the receiving unit 12 waits for receiving the time stamp S generated for hash value H transmitted by the transmitting section 15c. In Step S26, the storing processing section 15d adds the time stamp S received by the receiving unit 12 to the unupdated data 16b, and stores it in the storage unit 107.

Figure 9:
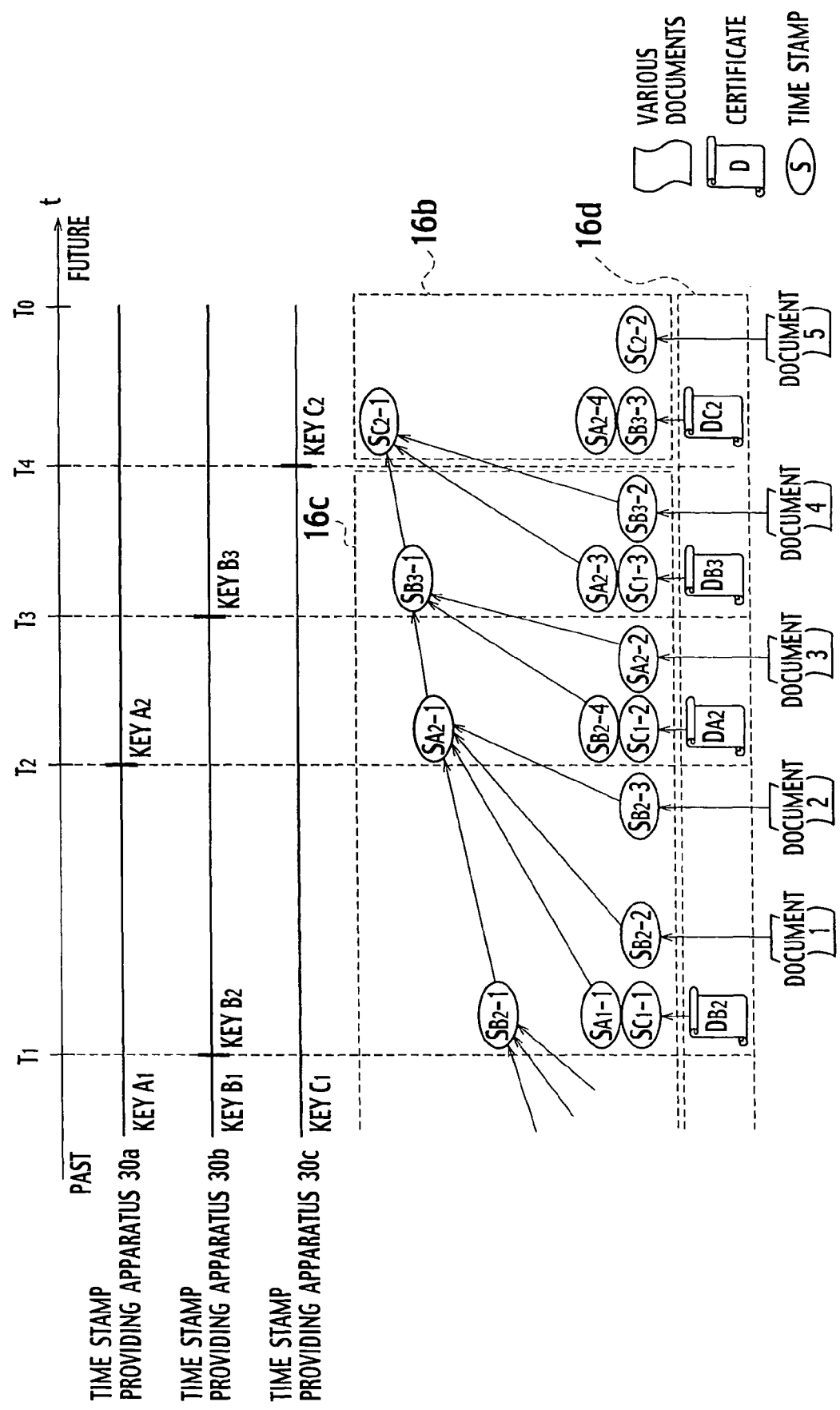
FIG. 9 is an illustration for explaining the update of the unupdated data shown in FIG. 7, when the new document data is registered.

For example, as shown in FIG. 9, the time stamp $SC_2$-2 generated for the hash value H of the document 5 received from the time stamp providing apparatus 30c is stored in the storage unit 107 as the unupdated data 16b.

According to the embodiment of the present invention mentioned above, when the private key used by the connected time stamp providing apparatus is updated, the time stamp obtaining apparatus overwrites a past time stamp with a new time stamp. As a result, even if the past time stamp is made to compromise after the overwriting, the existence of the past document data can be certified by the new time stamp.

Moreover, even if the public key certificate is made to compromise, effective existence of the public key certificate at the time period can be certified by obtaining the time stamp of other time stamp providing apparatuses for the public key certificate. Therefore, it need not lose the effectiveness of public key certificate.

FIRST EXAMPLE OF MODIFYING

Figure 10:
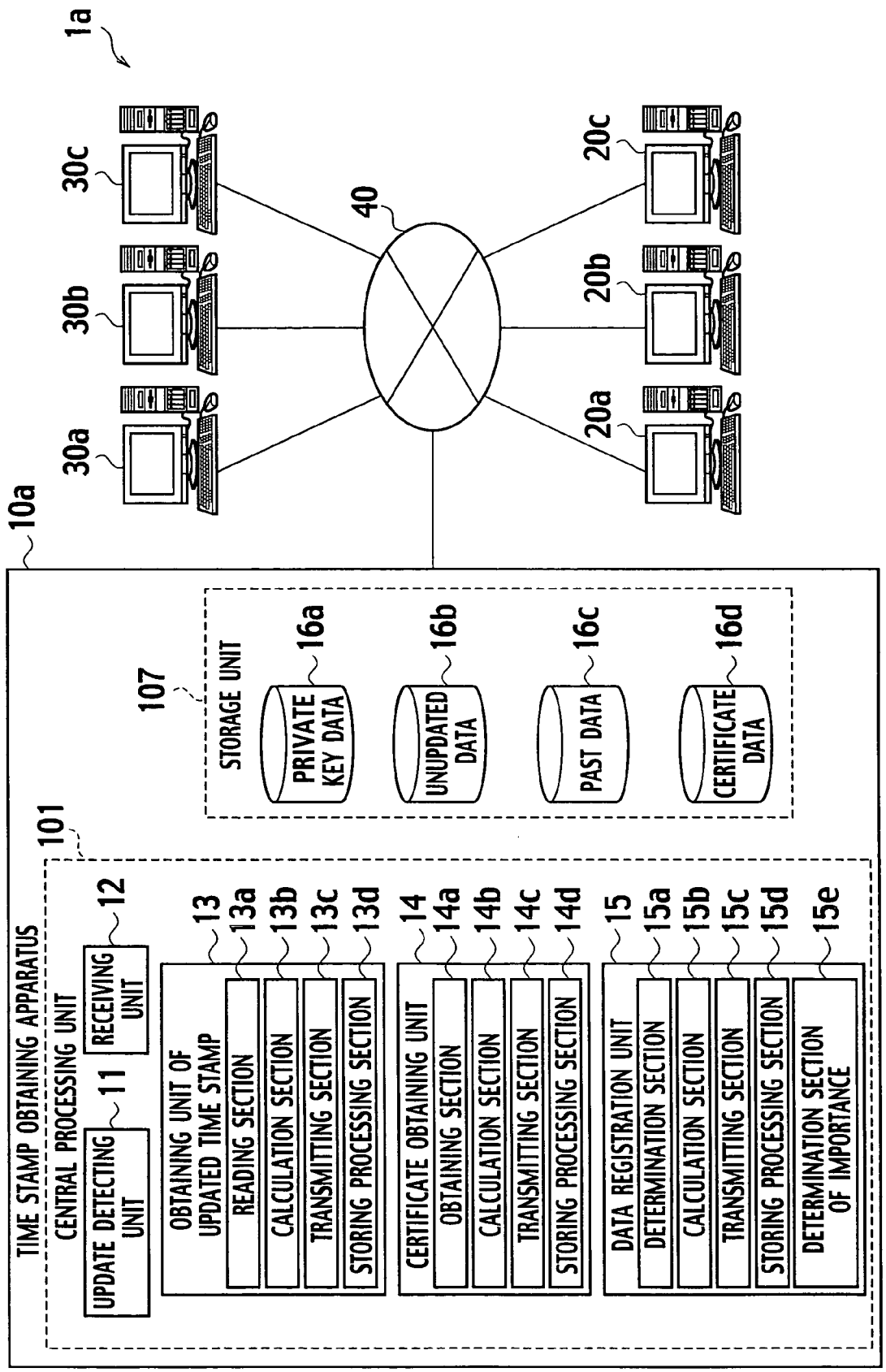
FIG. 10 is an illustration for explaining a time stamp obtaining system having a time stamp obtaining apparatus according to a first modified embodiment of the present invention.

A time stamp obtaining apparatus 10a according to a first example of the modifying of the present invention is shown in FIG. 10. Time stamp obtaining apparatus 10a according to the first example of the modifying is different in the point to include a determination section of importance 15e in the data registration section 15 compared with the time stamp obtaining apparatus 10 mentioned above based on FIG. 1.

The determination section of importance 15e receives electronic data or the hash value of the electronic data received by the receiving unit 12 from the terminal 20a and level data showing the importance of this electronic data. Then, the determination section of importance 15e outputs a movement directive corresponding to the level of importance of the received electronic data to the calculation section 15b.

An example of the level showing the importance of the electronic data will be described based on FIG. 11. In the example of showing in FIG. 11, the level of importance is set from L1 to L4 of the 4 step. Level L1 is the highest level of importance, and level L4 is the lowest level of importance.

Figure 11:
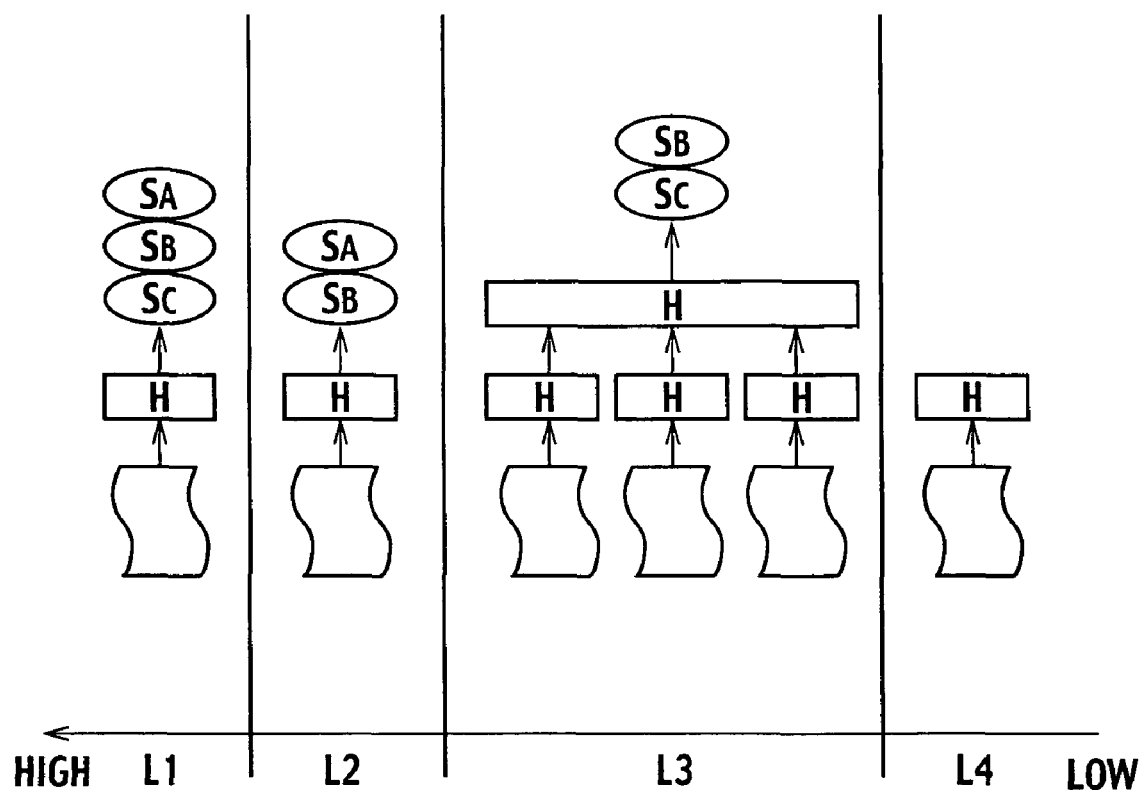
FIG. 11 is an example of importance data used by the time stamp obtaining apparatus according to the first modified embodiment of the present invention.

In the example of showing in FIG. 11, since the document determined which is level L1 is important, the time stamp obtaining apparatus 10a obtains the time stamp S from all time stamp providing apparatuses 30a to 30c. More specifically, the determination section of importance 15e outputs the movement directive of the transmission of the hash value H of the document data determined as level L1 to all of time stamp providing apparatus 30a to 30c that provides the time stamp SA, SB, and SC to the transmitting section 13c.

In the case where the document is determined as level L2, the time stamp obtaining apparatus 10a obtains the time stamp S of the predetermined number from time stamp providing apparatuses 30a. For example, the predetermined number may be 1, and the time stamp may be obtained only from the time stamp providing apparatus 30a which the update time of the private key is the nearest. In the example of showing in FIG. 11, the determination section of importance 15e outputs the movement directive that transmits the hash value H of the document data determined as level L2 to the time stamp providing apparatus 30a and 30b that provides the time stamp SA and SB to the transmitting section 13c.

In the case where the document is determined as level L3, the time stamp obtaining apparatus 10a obtains the time stamp S collectively according to the predetermined timing. For example, whenever the hash value H of level L3 is received in the predetermined number, the method to obtain the time stamp S generated considering the hash value of these received predetermined numbers as one data is considered. Moreover, the method to obtain the time stamp S generated considering all hash values regularly received as level L3 till then as one data is also considered.

Moreover, in the case where the document is determined as level L4, the time stamp obtaining apparatus 10a calculates only hash value H, and adds it to the unupdated data. Then, when the private key is updated next, the time stamp obtaining apparatus 10a newly calculates the hash value with this hash value H, other time stamps S, and the hash values H, and transmits the hash value to the time stamp providing apparatus 30a. As a result, the time stamp obtaining apparatus 10a obtains the generated time stamp.

As mentioned above, the access between the time stamp obtaining apparatus and the time stamp providing apparatus can be limited by providing the obtaining of the time stamp according to the level of importance, and also the cost by obtaining the time stamp can be reduced.

SECOND EXAMPLE OF MODIFYING

A time stamp obtaining apparatus 10b according to the second example of the modifying of the present invention is shown in FIG. 12. The time stamp obtaining apparatus 10b according to the second example of the modifying is different in the point to have a detecting section of time stamp providing apparatus 11a in the update detecting unit 11, and to have a providing apparatus data 16f, compared with the time stamp obtaining apparatus 10 mentioned above based on FIG. 1. Since the time stamp obtaining apparatus 10b is identical with the time stamp obtaining apparatus 10 mentioned above based on FIG. 1 about other compositions, and the process is also identical, the description is omitted.

The providing apparatus data 16f haves the identifier of the time stamp providing apparatus 30a connected with the time stamp obtaining apparatus 10b.

When the detecting section of time stamp providing apparatus 11a detects that the time stamp providing apparatus 30a identified by identifiers other than the identifier included in the providing apparatus data 16f is newly connected, the detecting section of time stamp providing apparatus 11a executes similar to operating when the update of the private key of the time stamp providing apparatus is detected.

As mentioned above, when the time stamp providing apparatus connected with the network is added, the process similar to the case where the private key is updated is executed. Moreover, the surveillance of the private key is then executed as well as other time stamp providing apparatuses, and when the private key is updated, the update operation is executed. As a result, since the number of the time stamps newly obtained is increased, and then the risk that the time stamp becomes a no effect can be further reduced.

Although the embodiments of the present invention have been explained, the present invention may be embodied in other specific forms without departing from the spirit or essential characteristics thereof. A variety of alternative embodiments, implementation examples, and the operation techniques are clear for those skilled in the art from this disclosure.

The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A time stamp providing system comprising a time stamp providing apparatus and a time stamp obtaining apparatus, the time stamp providing apparatus connected with the time stamp obtaining apparatus, the time stamp providing apparatus comprising:
a time stamp generate section configured to generate a time stamp by using an updated private key for data including time and a hash value received from the time stamp obtaining apparatus; and
a time stamp transmission section configured to transmit the time stamp generated by the time stamp generate section to the time stamp obtaining apparatus, and
the time stamp obtaining apparatus comprising:
a receiving unit configured to receive one of a document data and a hash value calculated from a document data transmitted from a terminal;

a first calculation section configured to calculate the received hash value of the document data;

a first transmitting section configured to transmit one of the hash value received from the terminal and the hash value calculated from the document data by the first calculation section to the time stamp providing apparatus;

a first storing processing section configured to add the time stamp to unupdated data and to store the time stamp in a storage unit when the time stamp generated for the hash value transmitted by the first transmitting section is received from the time stamp providing apparatus, the unupdated data being data concerning the time stamp received from the time stamp providing apparatus since a point to which a private key used by the time stamp providing apparatus is updated last time;

an update detecting section configured to detect update of the private key of the time stamp used by the time stamp providing apparatus;

a second calculation section configured to calculate one hash value for all time stamps included in the unupdated data when the update detecting section detects the update of the private key;

a second transmitting section configured to transmit the hash value calculated by the second calculation section to the time stamp providing apparatus; and a second storing processing section configured to move the unupdated data to past data and store the unupdated data in the storage unit when the time stamp generated for the hash value transmitted by the second transmitting section is received from the time stamp providing apparatus, and to store the newly received time stamp in the storage unit as new unupdated data, the past data being data concerning the time stamp received from the time stamp providing apparatus before point to which private key is updated by the time stamp providing apparatus last time.

2. A time stamp obtaining apparatus connected with the time stamp providing apparatus, the time stamp providing apparatus transmitting a time stamp generated by updated private key for data, the data including time and received hash value, the time stamp obtaining apparatus comprising:

a receiving unit configured to receive one of a document data and a hash value calculated from a document data transmitted from a terminal;

a first calculation section configured to calculate the received hash value of the document data;

a first transmitting section configured to transmit one of the hash value received from the terminal and the hash value calculated from the document data by the first calculation section to the time stamp providing apparatus;

a first storing processing section configured to add the time stamp to unupdated data and to store the time stamp in a storage unit when the time stamp generated for the hash value transmitted by the first transmitting section is received from the time stamp providing apparatus, the unupdated data being data concerning the time stamp received from the time stamp providing apparatus since point to which a private key used by the time stamp providing apparatus is updated last time;

an update detecting section configured to detect update of the private key of the time stamp used by the time stamp providing apparatus;

a second calculation section configured to calculate one hash value for all time stamps included in the unupdated data when the update detecting section detects the update of the private key;

a second transmitting section configured to transmit the hash value calculated by the second calculation section to the time stamp providing apparatus; and a second storing processing section configured to move the unupdated data to past data and store the unupdated data in the storage unit when the time stamp generated for the hash value transmitted by the second transmitting section is received from the time stamp providing apparatus, and to store the newly received time stamp in the storage unit as new unupdated data, the past data being data concerning the time stamp received from the time stamp providing apparatus before point to which private key is updated by the time stamp providing apparatus last time.

3. The time stamp obtaining apparatus of claim 2, further comprising:

an obtaining section connected with plural time stamp providing apparatuses, and configured to obtain a public key certificate of updated private key from the time stamp providing apparatus when the update detecting section detects the update of private key;

a third calculation section configured to calculate hash value of the obtained public key certificate;

a third transmitting section configured to transmit the hash value of the public key certificate to a time stamp providing apparatuses other than the time stamp providing apparatus receiving the public key certificate; and a third storing processing section configured to insert the received time stamp to the hash value of the transmitted public key certificate in the unupdated data, and store the received time stamp in the storage unit.

4. The time stamp obtaining apparatus of claim 3, wherein the first transmitting section transmits the hash value calculated by the first calculation section to the time stamp providing apparatus to which the private key is newest updated.

5. The time stamp obtaining apparatus of claim 2, further comprising:

a determination section of importance configured to read importance data, which includes corresponding movement directives to obtain the time stamp of respective levels of importance from the storage unit, when the receiving unit receives one of electronic data and the hash value of the electronic data and level of importance of the electronic data from the terminal, and to output the movement directive related to the level of importance of the received electronic data.

6. The time stamp obtaining apparatus of claim 3, further comprising:

a detecting section of time stamp providing apparatus configured to output the same signal as a signal output when the update detecting section detects update of the private key to the second calculation section when the connection of a new time stamp providing apparatus identified by identifiers other than the identifier included in the providing apparatus data including the identifier of the time stamp providing apparatus connected with the time stamp obtaining apparatus is detected, and to then make the new time stamp providing apparatus as surveillance target of the update detecting section.

7. A computer-executable program product stored on a non-transitory computer readable medium for obtaining a time stamp, the computer-executable program product when executed by a processor including a method comprising:

receiving one of a document data and a hash value calculated from a document data transmitted from a terminal;

calculating the hash value from the received document data;

transmitting one of the hash value received from the terminal and the hash value calculated from the document data received from the terminal to a time stamp providing apparatus;

adding the time stamp to the unupdated data which is data concerning the time stamp received from the time stamp providing apparatus since point to which the private key used by the time stamp providing apparatus is updated last time when the time stamp generated with an updated private key is received from the time stamp providing apparatus for data to which time and the transmitted the hash value are included, and storing the time stamp in a storage unit;

detecting update of the private key of the time stamp used by the time stamp providing apparatus;

calculating one hash value for all time stamps included in the unupdated data after detecting the update of the private key;

transmitting the calculated hash value for all time stamps included in the unupdated data to the time stamp providing apparatus; and moving the unupdated data to past data and storing the unupdated data in the storage unit when the time stamp generated with the updated private key is received from the time stamp providing apparatus for data to which time and the transmitted the hash value are included, and storing the newly received time stamp in the storage unit as new unupdated data, the past data being data concerning the time stamp received from the time stamp providing apparatus before point to which private key is updated by the time stamp providing apparatus last time.

8. The computer-executable program product of claim 7, wherein the method further comprises:

obtaining the time stamp from plural time stamp providing apparatuses, and obtaining the public key certificate of the updated private key from the time stamp providing apparatus when the update of the private key is detected at the update detection;

calculating hash value of the obtained public key certificate;

transmitting the hash value of the public key certificate to a time stamp providing apparatuses other than the time stamp providing apparatus receiving the public key certificate; and inserting the received time stamp to the hash value of the transmitted public key certificate in the unupdated data, and storing the received time stamp in the storage unit.

9. The computer-executable program product of claim 8, wherein in the transmitting one of the hash value received from the terminal and the hash value calculated from the document data received from the terminal, one of the hash value received from the terminal and the hash value calculated from the document data received from the terminal is transmitted to the time stamp providing apparatus to which the private key is newest updated.

10. The computer-executable program product of claim 7, wherein the method further comprises:

reading importance data, which includes corresponding movement directives to obtain the time stamp of respective levels of importance from the storage unit when the receiving unit receives one of electronic data and the hash value of the electronic data and level of importance of the electronic data from the terminal, and outputting the movement directive related to the level of importance of the received electronic data.

11. The computer-executable program product of claim 7, wherein the method further comprises:

sending the same signal as a signal output at detecting update of the private key when the connection of a new time stamp providing apparatus identified by identifiers other than the identifier included in the providing apparatus data including the identifier of the time stamp providing apparatus is detected, and then making the new time stamp providing apparatus as surveillance target of the update detecting.

12. A method of obtaining a time stamp, comprising the step of:

receiving one of a document data and a hash value calculated from a document data transmitted from a terminal;

calculating the hash value from the received document data;

transmitting one of the hash value received from the terminal and the hash value calculated from the document data received from the terminal to a time stamp providing apparatus;

adding the time stamp to the unupdated data which is data concerning the time stamp received from the time stamp providing apparatus since point to which the private key used by the time stamp providing apparatus is updated last time when the time stamp generated with an updated private key is received from the time stamp providing apparatus for data to which time and the transmitted the hash value are included, and storing the time stamp in a storage unit;

detecting update of the private key of the time stamp used by the time stamp providing apparatus;

calculating one hash value for all time stamps included in the unupdated data after detecting the update of the private key;

transmitting the calculated hash value for all time stamps included in the unupdated data to the time stamp providing apparatus; and moving the unupdated data to past data and storing the unupdated data in the storage unit when the time stamp generated with the updated private key is received from the time stamp providing apparatus for data to which time and the transmitted the hash value are included, and storing the newly received time stamp in the storage unit as new unupdated data, the past data being data concerning the time stamp received from the time stamp providing apparatus before point to which private key is updated by the time stamp providing apparatus last time.

13. The method of claim 12, further comprising:

obtaining the time stamp from plural time stamp providing apparatuses, and obtaining the public key certificate of the updated private key from the time stamp providing apparatus when the update of the private key is detected at the update detection;

calculating hash value of the obtained public key certificate;

transmitting the hash value of the public key certificate to a time stamp providing apparatuses other than the time stamp providing apparatus receiving the public key certificate; and inserting the received time stamp to the hash value of the transmitted public key certificate in the unupdated data, and storing the received time stamp in the storage unit.

14. The method of claim 13, wherein in the transmitting one of the hash value received from the terminal and the hash value calculated from the document data received from the terminal, one of the hash value received from the terminal and the hash value calculated from the document data received from the terminal is transmitted to the time stamp providing apparatus to which the private key is newest updated.

15. The method of claim 12, further comprising:

reading importance data, which includes corresponding movement directives to obtain the time stamp of respective levels of importance from the storage unit when the receiving unit receives one of electronic data and the hash value of the electronic data and level of importance of the electronic data from the terminal, and outputting the movement directive related to the level of importance of the received electronic data.

16. The method of claim 12, further comprising:

sending the same signal as a signal output at detecting update of the private key when the connection of a new time stamp providing apparatus identified by identifiers other than the identifier included in the providing apparatus data including the identifier of the time stamp providing apparatus is detected, and then making the new time stamp providing apparatus as surveillance target of the update detecting.

\* \* \* \* \*